US012200841B2

(12) United States Patent
Sakurada et al.

(10) Patent No.: US 12,200,841 B2
(45) Date of Patent: Jan. 14, 2025

(54) MARKING DEVICE, SYSTEM, AND CONTROL METHOD

(71) Applicant: TOYOTA JIDOSHA KABUSHIKI KAISHA, Toyota (JP)

(72) Inventors: Shin Sakurada, Toyota (JP); Yuko Mizuno, Nagoya (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 314 days.

(21) Appl. No.: 17/709,850

(22) Filed: Mar. 31, 2022

(65) Prior Publication Data

US 2022/0369440 A1 Nov. 17, 2022

(30) Foreign Application Priority Data

May 12, 2021 (JP) ................................ 2021-081303

(51) Int. Cl.
*H05B 47/10* (2020.01)
*F21S 8/02* (2006.01)
(Continued)

(52) U.S. Cl.
CPC ............ *H05B 47/115* (2020.01); *F21S 8/022* (2013.01); *F21W 2111/023* (2013.01)

(58) Field of Classification Search
CPC H05B 47/115; H05B 47/125; F21W 2111/02; F21W 2111/023; G08G 1/04;
(Continued)

(56) References Cited

U.S. PATENT DOCUMENTS 4,020,597 A 5/1977 Shigyo et al.
6,384,742 B1 5/2002 Harrison
(Continued)

FOREIGN PATENT DOCUMENTS

CN 111629472 A 9/2020
JP 2012-22948 A 2/2012
(Continued)

OTHER PUBLICATIONS

Mar. 13, 2023 Office Action issued in U.S. Appl. No. 17/702,935.
(Continued)

*Primary Examiner* — Tung X Le
(74) *Attorney, Agent, or Firm* — Oliff PLC

(57) ABSTRACT

A marking device includes each of a plurality of pedestrian light sources that is provided on a roadway and that emits light in at least one of a first direction and a second direction along a width direction of the roadway, each of a plurality of vehicle light sources that is provided on the roadway and that emits light in at least one of a third direction and a fourth direction along an extension direction of the roadway, and a control unit that separately controls the pedestrian light sources and the vehicle light sources. The control unit lights the pedestrian light sources, causing them to mark a first pedestrian crossing to be visually recognized by a pedestrian who is going to cross the roadway, and lights the vehicle light sources, causing them to mark a second pedestrian crossing to be visually recognized by a driver of a vehicle.

14 Claims, 5 Drawing Sheets

(51) Int. Cl.
*H05B 47/115* (2020.01)
*F21W 111/023* (2006.01)

(58) Field of Classification Search
CPC ........ G08G 1/005; G08G 1/095; G08G 1/166; B60Q 1/507; B60Q 1/525
See application file for complete search history.

(56) References Cited

U.S. PATENT DOCUMENTS

| | | | | |
|---|---|---|---|---|
| 6,597,293 | B1 | 7/2003 | Harrison | |
| 7,688,222 | B2 | 3/2010 | Peddie et al. | |
| 7,777,646 | B2 | 8/2010 | Konforty et al. | |
| 9,771,021 | B1 * | 9/2017 | Lindsay | B60Q 1/525 |
| 10,550,532 | B2 | 2/2020 | Trifan | |
| 2009/0091474 | A1 | 4/2009 | Konforty et al. | |
| 2012/0148104 | A1 | 6/2012 | Nanri et al. | |
| 2013/0321173 | A1 * | 12/2013 | Ni | G08G 1/07 340/907 |
| 2018/0174460 | A1 * | 6/2018 | Jung | G08G 1/166 |
| 2018/0260182 | A1 * | 9/2018 | Suzuki | B60Q 1/547 |
| 2019/0088112 | A1 * | 3/2019 | Jung | G08G 1/166 |
| 2020/0356111 | A1 | 11/2020 | Takemura et al. | |
| 2021/0347294 | A1 * | 11/2021 | Mochizuki | F21S 41/27 |
| 2021/0370823 | A1 * | 12/2021 | Stein | G06V 20/588 |
| 2022/0281381 | A1 * | 9/2022 | Clochard | G08G 1/094 |
| 2023/0095384 | A1 * | 3/2023 | Sharma Banjade | G08G 1/096725 701/301 |
| 2023/0206755 | A1 * | 6/2023 | Jha | H04W 4/40 340/425.5 |

FOREIGN PATENT DOCUMENTS

| | | | |
|---|---|---|---|
| JP | 2013-096201 | A | 5/2013 |
| JP | 2014-225151 | A | 12/2014 |

OTHER PUBLICATIONS

Jul. 20, 2023 Notice of Allowance issued in U.S. Appl. No. 17/702,935.

Aug. 15, 2024 Notice of Allowance issued in U.S. Appl. No. 18/379,875.

* cited by examiner

MARKING DEVICE, SYSTEM, AND CONTROL METHOD

CROSS-REFERENCE TO RELATED APPLICATION

This application claims priority to Japanese Patent Application No. 2021-081303 filed on May 12, 2021, incorporated herein by reference in its entirety.

BACKGROUND

1. Technical Field

The present disclosure relates to a marking device, a system, and a control method.

2. Description of Related Art

Conventionally, a technique for causing a human being such as a pedestrian or a driver to recognize a pedestrian crossing on a road on which a vehicle such as an automobile travels is known. For example, Japanese Unexamined Patent Application Publication No. 2013-096201 (JP 2013-096201 A) discloses a self-luminous road stud device that lights or blinks a plurality of self-luminous road studs arranged side by side along a pedestrian crossing when it is detected that a pedestrian crosses the pedestrian crossing.

SUMMARY

There was room for improvement in the technique for causing a human being to recognize a pedestrian crossing on a road.

The purpose of the present disclosure made in view of such circumstances is to improve the technique for causing a human being to recognize a pedestrian crossing on a road.

A marking device according to one embodiment of the present disclosure includes each of a plurality of pedestrian light sources that is provided on a roadway and that emits light in at least one of a first direction and a second direction along a width direction of the roadway, each of a plurality of vehicle light sources that is provided on the roadway and that emits light in at least one of a third direction and a fourth direction along an extension direction of the roadway, and a control unit that separately controls the pedestrian light sources and the vehicle light sources. The control unit lights the pedestrian light sources, causing the pedestrian light sources to mark a first pedestrian crossing to be visually recognized by a pedestrian who is going to cross the roadway, and lights the vehicle light sources, causing the vehicle light sources to mark a second pedestrian crossing to be visually recognized by a driver of a vehicle on the roadway.

A system according to one embodiment of the present disclosure includes a marking device including each of a plurality of pedestrian light sources that is provided on a roadway and that emits light in at least one of a first direction and a second direction along a width direction of the roadway, and each of a plurality of vehicle light sources that is provided on the roadway and that emits light in at least one of a third direction and a fourth direction along an extension direction of the roadway, and a control device that communicates with the marking device to separately control the pedestrian light sources and the vehicle light sources. The control device lights the pedestrian light sources, causing the pedestrian light sources to mark a first pedestrian crossing to be visually recognized by a pedestrian who is going to cross the roadway, and lights the vehicle light sources, causing the vehicle light sources to mark a second pedestrian crossing to be visually recognized by a driver of a vehicle on the roadway.

A control method according to the one embodiment of the present disclosure is a control method of a marking device that includes each of a plurality of pedestrian light sources that is provided on a roadway and that emits light in at least one of a first direction and a second direction along a width direction of the roadway, each of a plurality of vehicle light sources that is provided on the roadway and that emits light in at least one of a third direction and a fourth direction along an extension direction of the roadway, and a control unit that separately controls the pedestrian light sources and the vehicle light sources. The control method includes lighting the pedestrian light sources with the control unit, causing the pedestrian light sources to mark a first pedestrian crossing to be visually recognized by a pedestrian who is going to cross the roadway, and lighting the vehicle light sources with the control unit, causing the vehicle light sources to mark a second pedestrian crossing to be visually recognized by a driver of a vehicle on the roadway.

According to one embodiment of the present disclosure, a technique for causing a human being to recognize a pedestrian crossing on a road is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described.

Outline of Embodiment

Figure 1:
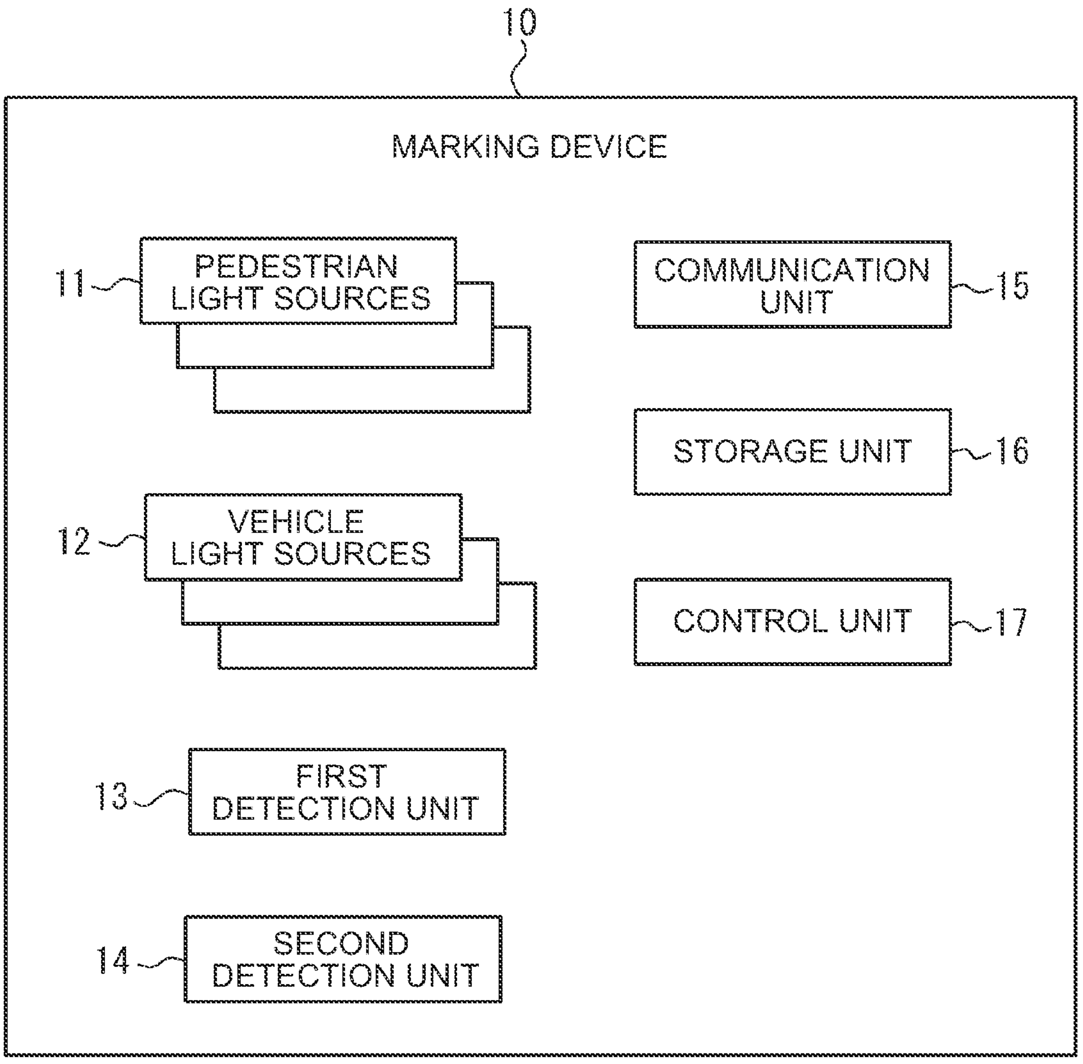
FIG. 1 is a block diagram showing a schematic configuration of a marking device according to one embodiment of the present disclosure.

The outline of a marking device 10 according to an embodiment of the present disclosure will be described with reference to FIGS. 1 and 2. Generally, the marking device 10 is a device for marking a pedestrian crossing on a roadway on which a vehicle such as an automobile travels. The marking device 10 shown in FIG. 1 includes a plurality of pedestrian light sources 11, a plurality of vehicle light sources 12, a first detection unit 13, a second detection unit 14, a communication unit 15, a storage unit 16, and a control unit 17.

Each of the pedestrian light source 11 and the vehicle light source 12 includes one or more light emitting elements. The light emitting element is, for example, a light emitting diode (LED), a laser diode, or the like, but is not limited to these.

Each of the pedestrian light sources 11 is provided on the roadway so as to emit light in at least one of a first direction and a second direction along a width direction of the roadway. For example, the pedestrian light source 11 may include a mask that shields light from directions other than the at least one direction. Alternatively, the light of the pedestrian light source 11 may have directivity in the at least one direction.

On the other hand, each of the vehicle light sources 12 is provided on the roadway so as to emit light in at least one of a third direction and a fourth direction along an extension direction of the roadway. The "extension direction" is a direction in which the roadway extends, and is substantially orthogonal to, for example, the width direction of the roadway. For example, the vehicle light source 12 may include a mask that shields light from directions other than the at least one direction. Alternatively, the light of the vehicle light source 12 may have directivity in the at least one direction.

Figure 2:
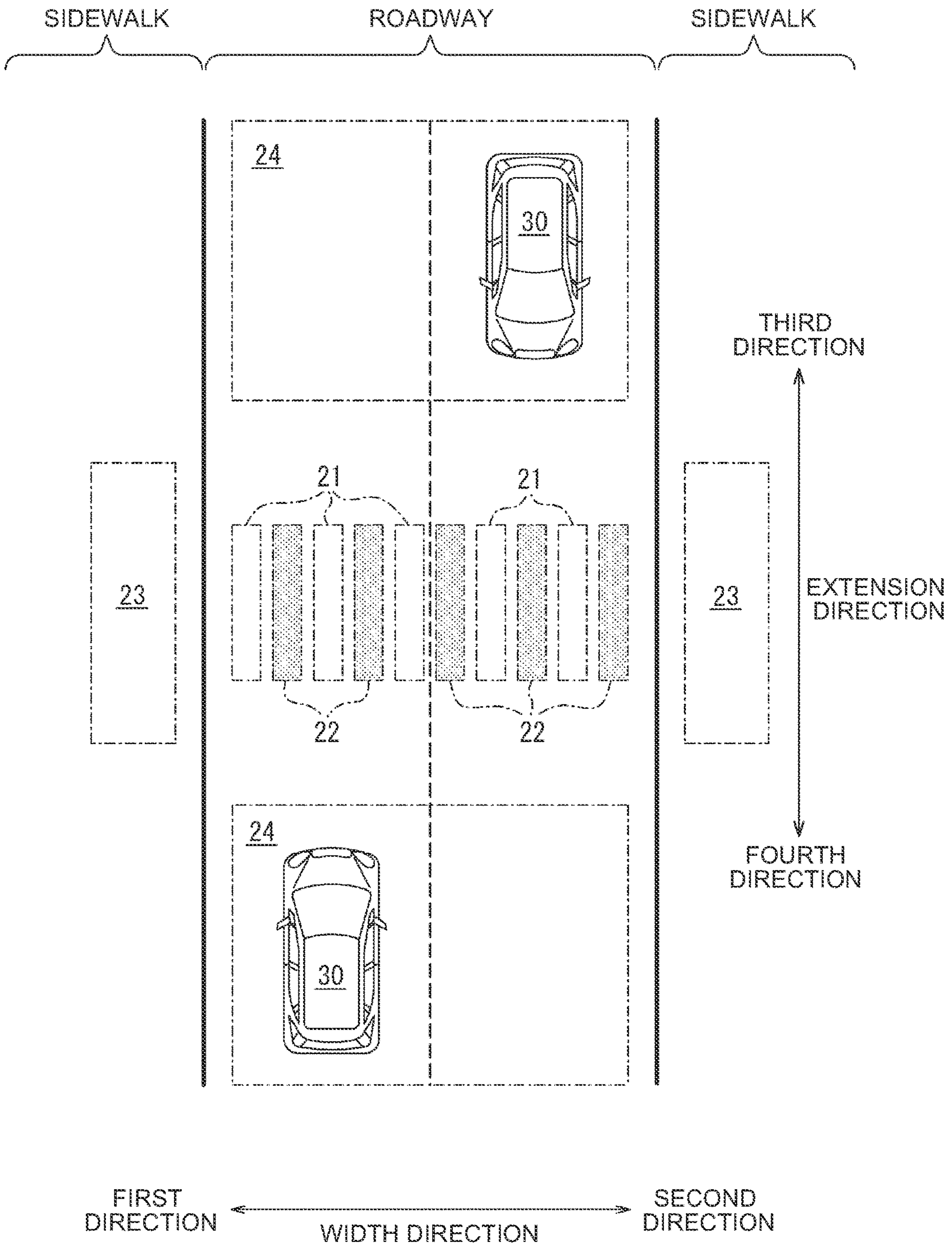
FIG. 2 is a diagram showing an example of a bird's-eye view of a roadway and a sidewalk.

In the present embodiment, for example, as shown in FIG. 2, the pedestrian light sources 11 are provided to be distributed in a plurality of first regions 21 on the roadway. On the other hand, the vehicle light sources 12 are provided to be distributed in a plurality of second regions 22 on the roadway. The first regions 21 and the second regions 22 are alternately arranged side by side from one end side to the other end side in the width direction of the roadway. Each of the pedestrian light sources 11 and the vehicle light sources 12 may be embedded in the roadway, for example. Each of the pedestrian light sources 11 and the vehicle light sources 12 may be provided to project from a road surface of the roadway, may be provided to be recessed from the road surface, or may be provided to be flat to the road surface.

The light of the pedestrian light source 11 is emitted in at least one of the first direction and the second direction along the width direction of the roadway as described above. It is relatively easy for a pedestrian on a sidewalk located at each side of the roadway to visually recognize the light of each of the pedestrian light sources 11 that is arranged to be distributed in the first regions 21. However, it is relatively difficult for a driver of a vehicle 30 located on the roadway to visually recognize the light of each of the pedestrian light sources 11 that is arranged to be distributed in the first regions 21. Therefore, when the pedestrian light sources 11 are lit, the first regions 21 function as a first pedestrian crossing to be visually recognized by the pedestrian who is going to cross the roadway. In the present embodiment, "lighting" is not limited to, for example, continuously lighting, and may include, for example, blinking in a predetermined cycle or pattern.

The light of the vehicle light source 12 is emitted in at least one of the third direction and the fourth direction along the extension direction of the roadway as described above. It is relatively easy for a driver of the vehicle 30 located on the roadway to visually recognize the light of each of the vehicle light sources 12 that is arranged to be distributed in the second regions 22. However, it is relatively difficult for a pedestrian on a sidewalk located at each side of the roadway to visually recognize the light of each of the vehicle light sources 12 that is arranged to be distributed in the second regions 22. Therefore, when the vehicle light sources 12 are lit, the second regions 22 function as a second pedestrian crossing to be visually recognized by the driver of the vehicle 30 on the roadway.

The first detection unit 13 includes one or more sensors for detecting a pedestrian who is going to cross the roadway. In the present embodiment, the first detection unit 13 includes a plurality of load sensors provided in a third region 23 on the sidewalk. The third region 23 may be provided, for example, near the end in the width direction of the roadway. When a pedestrian stops in the third region 23, the pedestrian can be detected as a pedestrian who is going to cross the roadway. However, the sensor included in the first detection unit 13 and the arrangement of the sensor are not limited to the above example, and may be determined as appropriate. For example, a surveillance camera provided on the sidewalk may be adopted as the sensor. In such a case, it is possible to detect a pedestrian who is going to cross the roadway from a video of the surveillance camera using any image recognition process.

The second detection unit 14 includes one or more sensors for detecting the vehicle 30 on the roadway. In the present embodiment, the second detection unit 14 is provided in a fourth region 24 on the roadway and includes a plurality of wireless communication interfaces that communicates with each of the vehicles 30 on the roadway. The fourth region 24 may include, for example, a region corresponding to a lane of the roadway. When the vehicle 30 travels in the fourth region 24, it can be determined that the vehicle 30 is located on the roadway. However, the sensor included in the second detection unit 14 and the arrangement of the sensor are not limited to the above example, and may be determined as appropriate. For example, the wireless communication interfaces described above may be provided on the sidewalk along the roadway, or may be provided in a columnar or arched structure provided along the roadway. Further, for example, the second detection unit 14 may include a plurality of load sensors provided in the fourth region 24 on the roadway. The lengths of the first region 21, the second region 22, the third region 23, and the fourth region 24 along the extension direction of the roadway are not limited to the example shown in FIG. 2. For example, each of the first region 21, the second region 22, the third region 23, and the fourth region 24 may be extended along the roadway.

The communication unit 15 includes one or more communication interfaces for communicating with each of the pedestrian light sources 11, the vehicle light sources 12, the first detection unit 13, and the second detection unit 14 by wire or wirelessly. The communication interface supports, for example, mobile communication standards such as 4th generation (4G) or 5th generation (5G), or a short-range wireless communication standards such as Wifi (registered trademark) or Bluetooth (registered trademark). The supported standards are not limited to these, and the communication interface may support any mobile communication standards. The communication unit 15 may communicate with each of the pedestrian light sources 11, the vehicle light sources 12, the first detection unit 13, and the second detection unit 14 via the Internet or an inter-terminal communication network, for example.

The storage unit 16 includes one or more memories. The memories are, for example, a semiconductor memory, a magnetic memory, or an optical memory, but are not limited to these memories. Each memory included in the storage unit 16 may function as, for example, a main storage device, an auxiliary storage device, or a cache memory. The storage unit 16 stores any information used for the operation of the marking device 10. For example, the storage unit 16 may store a system program, an application program, and embedded software.

The control unit 17 includes one or more processors, one or more programmable circuits, one or more dedicated circuits, or a combination of these. The processors are, for example, a general-purpose processor such as a central process unit (CPU) or a graphics process unit (GPU), or a dedicated processor specialized for a specific process, but are not limited to these processors. The programmable circuits are, for example, a field-programmable gate array (FPGA), but are not limited to the circuit. The dedicated circuits are, for example, an application specific integrated circuit (ASIC), but are not limited to the circuit. The control unit 17 can communicate with each of the pedestrian light sources 11, the vehicle light sources 12, the first detection unit 13, and the second detection unit 14 via the communication unit 15. The communication unit 15, the storage unit 16, and the control unit 17 described above may be provided in, for example, one or more edge computers disposed along the roadway.

The control unit 17 controls the operation of the entire marking device 10. In the present embodiment, the control unit 17 can separately control the pedestrian light sources 11 and the vehicle light sources 12.

Operation Flow of Marking Device

Figure 3:
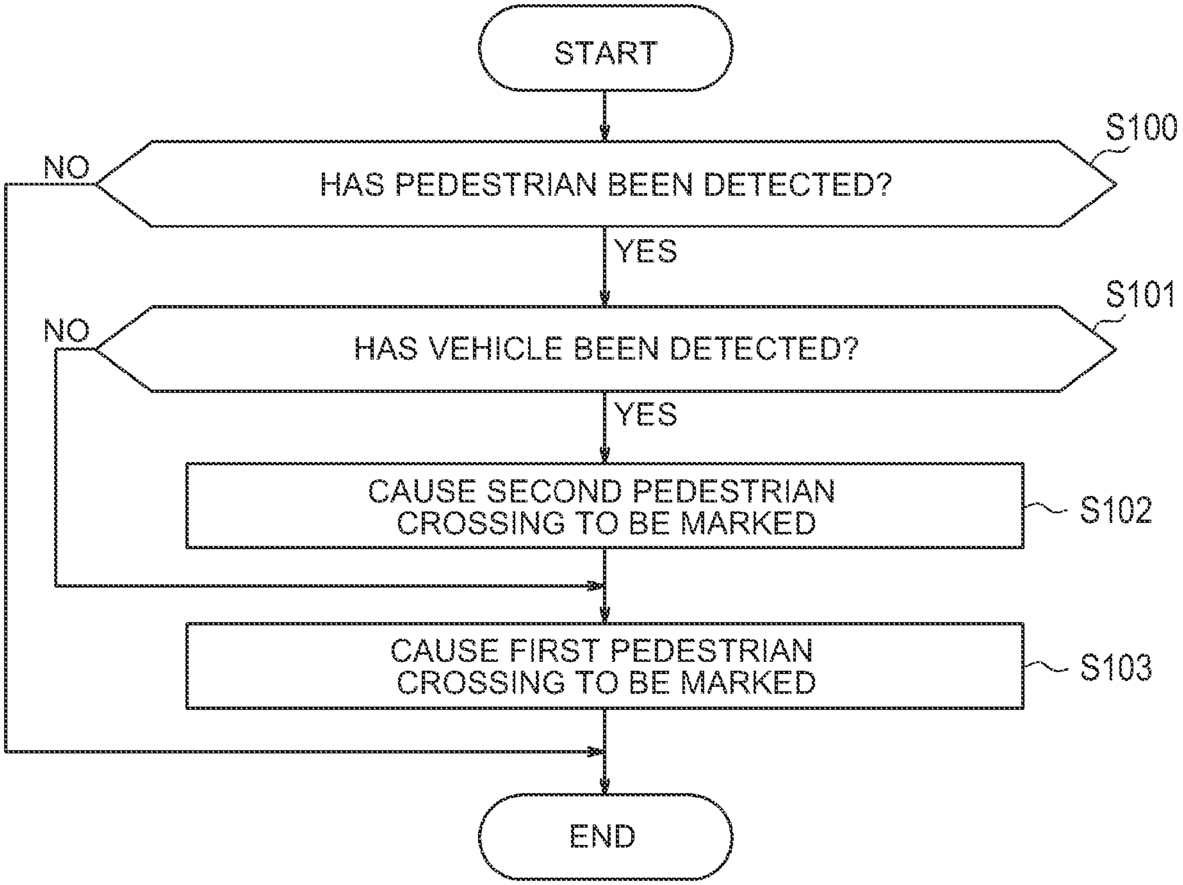
FIG. 3 is a flowchart showing an operation of the marking device.

The operation of the marking device 10 according to the present embodiment will be described with reference to FIG. 3. The operation can be performed repeatedly and periodically, for example.

Step S100: The control unit 17 of the marking device 10 determines whether a pedestrian who is going to cross the roadway has been detected based on information acquired from the first detection unit 13 via the communication unit 15. When the control unit 17 determines that a pedestrian who is going to cross the roadway has been detected (step S100—Yes), the process proceeds to step S101. On the other hand, when the control unit 17 determines that a pedestrian who is going to cross the roadway has not been detected (step S100—No), the process ends.

Specifically, the control unit 17 acquires an output signal of the sensor from the first detection unit 13 via the communication unit 15. Based on the output signal, the control unit 17 may determine that a pedestrian who is going to cross the roadway has been detected when a weight equal to or greater than a predetermined threshold value is detected at substantially the same position in the third region 23 for a predetermined time, for example. However, the detection method of a pedestrian who is going to cross the roadway is not limited to the above example, and any method can be adopted. For example, when the first detection unit 13 includes the surveillance camera as the sensor as described above, the control unit 17 acquires a video acquired from the first detection unit 13 as an output signal. The control unit 17 executes any image recognition process using the video, and may determine that the pedestrian who is going to cross the roadway has been detected when a predetermined time has elapsed while the pedestrian faces the roadway without moving.

Step S101: When the control unit 17 determines in step S100 that the pedestrian who is going to cross the roadway has been detected (step S100—Yes), the control unit 17 determines whether the vehicle 30 has been detected on the roadway based on information acquired from the second detection unit 14 via the communication unit 15. When the control unit 17 determines that the vehicle 30 has been detected on the roadway (step S101—Yes), the process proceeds to step S102. On the other hand, when the control unit 17 determines that the vehicle 30 has not been detected on the roadway (step S101—No), the process proceeds to step S103.

Specifically, the control unit 17 acquires an output signal of the sensor from the second detection unit 14 via the communication unit 15. Based on the output signal, the control unit 17 may determine that the vehicle 30 has been detected on the roadway when the vehicle 30 is detected within a predetermined distance range from the pedestrian detected in step S100, for example. However, the detection method of the vehicle 30 on the roadway is not limited to the above example, and any method can be adopted.

Step S102: When the control unit 17 determines in step S101 that the vehicle 30 has been detected on the roadway (step S101—Yes), the control unit 17 lights the vehicle light sources 12, causing them to mark the second pedestrian crossing to be visually recognized by the vehicle 30 on the roadway.

Figure 4:
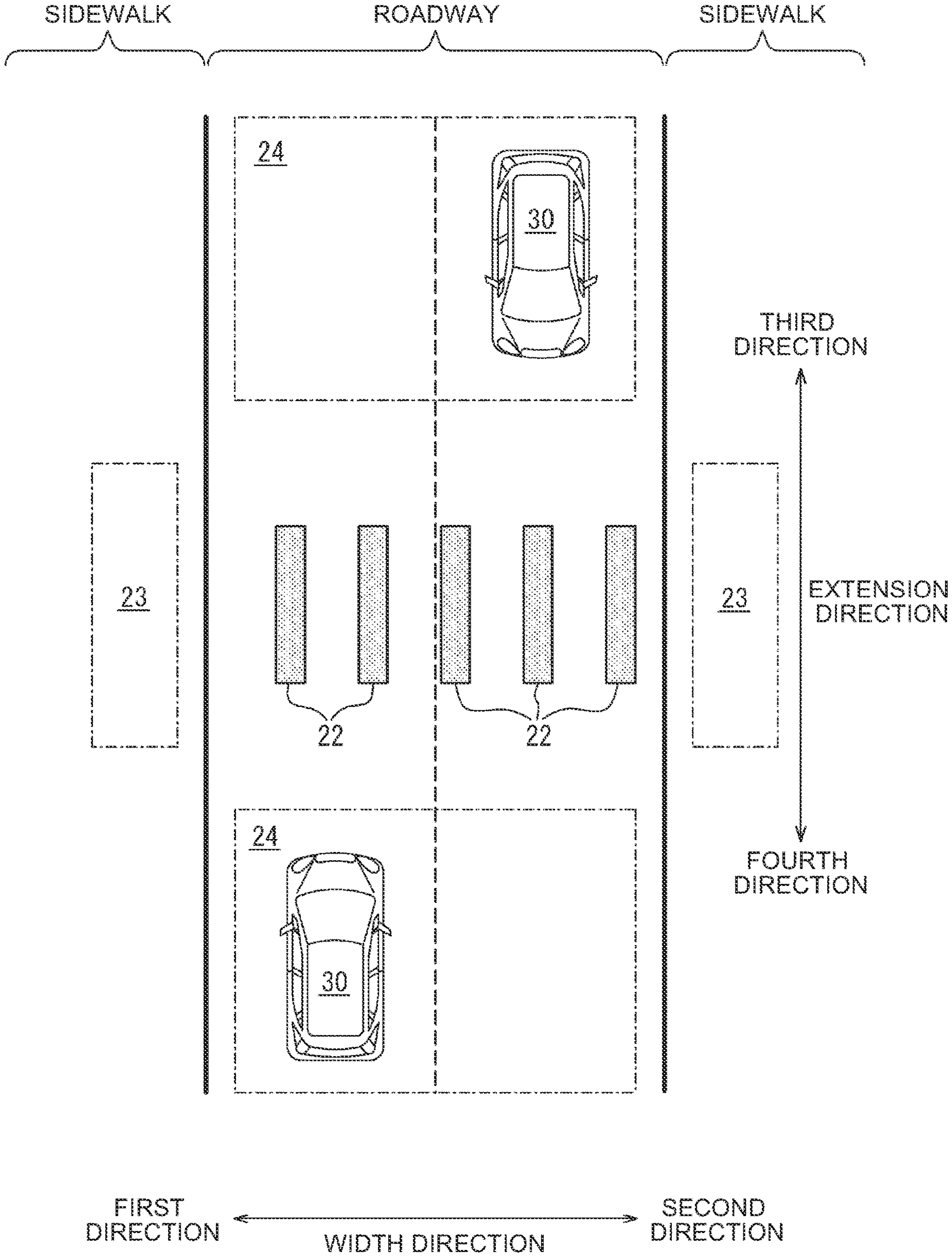
FIG. 4 is a diagram showing an example of a second pedestrian crossing marked on the roadway.

Specifically, the control unit 17 transmits a predetermined control signal to the vehicle light sources 12 via the communication unit 15. The vehicle light sources 12 emit light in response to the reception of the control signal. As described above, the vehicle light sources 12 are arranged to be distributed in the second regions 22 on the roadway. Therefore, the driver of the vehicle 30 can visually recognize the second pedestrian crossing marked by the second regions 22 that emit light as shown in FIG. 4, for example. The driver of the vehicle 30 can encourage the pedestrian to cross the roadway by stopping at the visually recognized second pedestrian crossing. As described above, it is relatively difficult for the pedestrian on the sidewalk to visually recognize the second pedestrian crossing marked by the second regions 22.

Step S103: After step S102, or when the control unit 17 determines in step S101 that the vehicle 30 has not been detected on the roadway (step S101—No), the control unit 17 lights the pedestrian light sources 11, causing them to mark the first pedestrian crossing to be visually recognized by the pedestrian who is going to cross the roadway. After that, the process ends.

Figure 5:
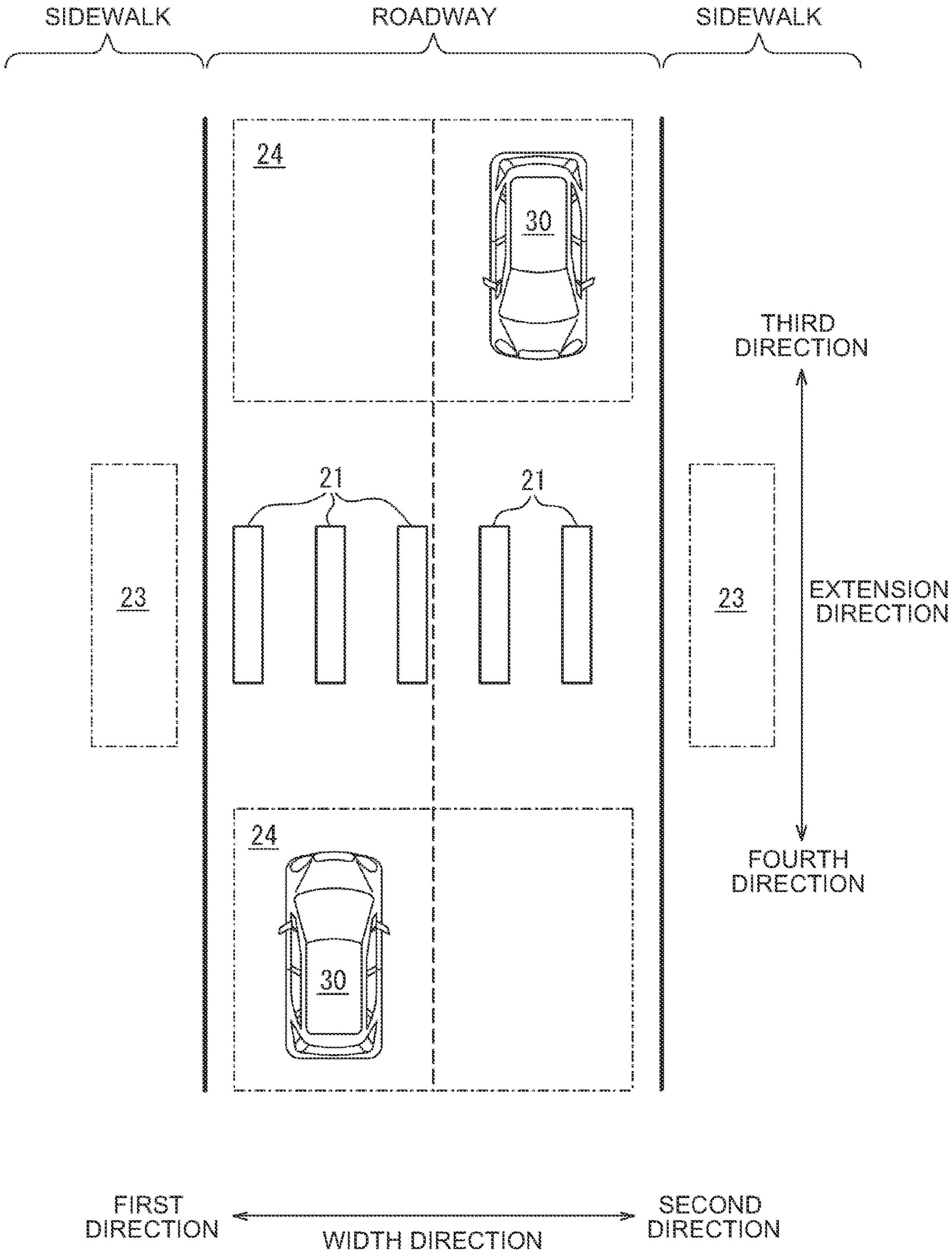
FIG. 5 is a diagram showing an example of a first pedestrian crossing marked on the roadway.

Specifically, the control unit 17 transmits a predetermined control signal to the pedestrian light sources 11 via the communication unit 15. The pedestrian light sources 11 emit light in response to the reception of the control signal. As described above, the pedestrian light sources 11 are arranged to be distributed in the first regions 21 on the roadway. Therefore, the pedestrian on the sidewalk can visually recognize the first pedestrian crossing marked by the first regions 21 that emit light as shown in FIG. 5, for example. The pedestrian who is going to cross the roadway can pass the first pedestrian crossing and cross the roadway by confirming that the vehicle 30 is not located on the roadway or that the vehicle 30 stops at the first pedestrian crossing. As described above, it can be relatively difficult for the driver of the vehicle 30 on the roadway to visually recognize the first pedestrian crossing marked by the first regions 21.

As described above, the marking device 10 according to the present embodiment includes the pedestrian light sources 11, the vehicle light sources 12, and the control unit 17 that separately controls the pedestrian light sources 11 and the vehicle light sources 12. Each of the pedestrian light sources 11 is provided on the roadway and emits light in at least one of the first direction and the second direction along the width direction of the roadway. Each of the vehicle light sources 12 is provided on the roadway and emits light in at least one of the third direction and the fourth direction along the extension direction of the roadway. The control unit 17 lights the pedestrian light sources 11, causing them to mark the first pedestrian crossing (for example, corresponding to the first regions 21 in FIG. 5) to be visually recognized by the pedestrian who is going to cross the roadway. Then, the control unit 17 lights the vehicle light sources 12, causing them to mark the second pedestrian crossing (for example, corresponding to the second regions 22 in FIG. 4) to be visually recognized by the driver of the vehicle 30 on the roadway.

According to such a configuration, the marking of the first pedestrian crossing to be visually recognized by the pedestrian and the marking of the second pedestrian crossing to be visually recognized by the driver of the vehicle 30 can be controlled separately and dynamically. Therefore, a technique for causing a human being to recognize a pedestrian crossing on a road is improved in that, a pedestrian crossing can be marked with a high degree of freedom according to situations of a roadway and a sidewalk, for example, only one of the first pedestrian crossing and the second pedestrian crossing is marked, or both of the first pedestrian crossing and the second pedestrian crossing are marked.

Although the present disclosure has been described above based on the drawings and the embodiment, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

For example, part of the configuration of the marking device 10 according to the above embodiment may be provided in a control device capable of communicating with the marking device 10. For example, the communication unit 15, the storage unit 16, and the control unit 17 may be provided in the control device. As described above, the present disclosure can also be realized as a system including the marking device 10 and the control device.

Further, for example, in the above embodiment, an example in which each of the pedestrian light sources 11 emits light in at least one of the first direction and the second direction along the width direction of the roadway has been described. In addition, an example in which each of the vehicle light sources 12 emits light in at least one of the third direction and the fourth direction along the extension direction of the roadway has been described. However, the pedestrian light sources 11 may include a plurality of first pedestrian light sources 11*a* that emits light in the first direction, and a plurality of second pedestrian light sources 11*b* that emits light in the second direction. Similarly, the vehicle light sources 12 may include a plurality of first vehicle light sources 12*a* that emits light in the third direction, and a plurality of second vehicle light sources 12*b* that emits light in the fourth direction. The control unit 17 of the marking device 10 may be able to separately control the first pedestrian light sources 11*a* and the second pedestrian light sources 11*b*. Further, the control unit 17 may be able to separately control the first vehicle light sources 12*a* and the second vehicle light sources 12*b*. According to such a configuration, the control unit 17 can control four pedestrian crossings separately and dynamically, for example, a pedestrian crossing to be visually recognized by a pedestrian located on the roadway on the left side of FIG. 2, a pedestrian crossing to be visually recognized by a pedestrian located on the roadway on the right side of FIG. 2, a pedestrian crossing to be visually recognized by a driver of the vehicle 30 that travels from the lower side to the upper side of FIG. 2, and a pedestrian crossing to be visually recognized by a driver of the vehicle 30 that travels from the upper side to the lower side of FIG. 2. Therefore, a technique for causing a human being to recognize a pedestrian crossing on a road is further improved in that, the degree of freedom for marking a pedestrian crossing is improved, that is, a pedestrian crossing can be marked with a high degree of freedom according to situations of a roadway and a sidewalk, for example, only one of the first pedestrian crossing and the second pedestrian crossing is marked, or both of the first pedestrian crossing and the second pedestrian crossing are marked.

Further, an embodiment is also possible in which, for example, a general-purpose computer functions as the marking device 10 according to the above embodiment. Specifically, a program describing processing contents for realizing each function of the marking device 10 according to the above embodiment is stored in the memory of the general-purpose computer, and the program is read out and executed by the processor. Therefore, the present disclosure can also be realized as a program that can be executed by the processor or a non-transitory computer-readable medium that stores the program.

What is claimed is:

1. A marking device comprising:

a plurality of pedestrian light sources on a roadway and that emits light in at least one of a first direction and a second direction along a width direction of the roadway;

a plurality of vehicle light sources on the roadway and that emits light in at least one of a third direction and a fourth direction along an extension direction of the roadway;

a first sensor configured to detect that a pedestrian is going to cross the roadway;

a second sensor configured to detect that the vehicle on the roadway; and a control unit configured to separately control the pedestrian light sources and the vehicle light sources, light the pedestrian light sources to mark a first pedestrian crossing to be visually recognized by the pedestrian, light the vehicle light sources to mark a second pedestrian crossing to be visually recognized by a driver of a vehicle on the roadway, cause at least the first pedestrian crossing to be marked when the pedestrian who is going to cross the roadway is detected, and cause both the first pedestrian crossing and the second pedestrian crossing to be marked when the pedestrian who is going to cross the roadway is detected and the vehicle is detected on the roadway.

2. The marking device according to claim 1, wherein the control unit is configured to not cause the second pedestrian crossing to be marked and cause the first pedestrian crossing to be marked when the pedestrian who is going to cross the roadway is detected and the vehicle is not detected on the roadway.

3. The marking device according to claim 1, wherein:

the pedestrian light sources are distributed in a plurality of first regions on the roadway;

the vehicle light sources are distributed in a plurality of second regions on the roadway; and the first regions and the second regions are alternately arranged side by side from one end side to another end side in the width direction of the roadway.

4. The marking device according to claim 1, wherein:

the pedestrian light sources include a plurality of first pedestrian light sources that emits light in the first direction and a plurality of second pedestrian light sources that emits light in the second direction;

the vehicle light sources include a plurality of first vehicle light sources that emits light in the third direction and a plurality of second vehicle light sources that emits light in the fourth direction; and the control unit is configured to separately control the first pedestrian light sources and the second pedestrian light sources, and separately control the first vehicle light sources and the second vehicle light sources.

5. The marking device according to claim 1, wherein:

each of the pedestrian light sources emits light in both the first direction and the second direction; and each of the vehicle light sources emits light in both the third direction and the fourth direction.

6. A system comprising:

a marking device including a plurality of pedestrian light sources on a roadway and that emits light in at least one of a first direction and a second direction along a width direction of the roadway, and a plurality of vehicle light sources on the roadway and that emits light in at least one of a third direction and a fourth direction along an extension direction of the roadway;

a first sensor configured to detect that a pedestrian is going to cross the roadway;

a second sensor configured to detect that the vehicle on the roadway; and a control device configured to communicate with the marking device to separately control the pedestrian light sources and the vehicle light sources, light the pedestrian light sources to mark a first pedestrian crossing to be visually recognized by the pedestrian, light the vehicle light sources to mark a second pedestrian crossing to be visually recognized by a driver of a vehicle on the roadway, cause at least the first pedestrian crossing to be marked when the pedestrian who is going to cross the roadway is detected, and cause both the first pedestrian crossing and the second pedestrian crossing to be marked when the pedestrian who is going to cross the roadway is detected and the vehicle is detected on the roadway.

7. The system according to claim 6, wherein the control device is configured to not cause the second pedestrian crossing to be marked and cause the first pedestrian crossing to be marked when the pedestrian who is going to cross the roadway is detected and the vehicle is not detected on the roadway.

8. The system according to claim 6, wherein:

the pedestrian light sources are distributed in a plurality of first regions on the roadway;

the vehicle light sources are distributed in a plurality of second regions on the roadway; and the first regions and the second regions are alternately arranged side by side from one end side to another end side in the width direction of the roadway.

9. The system according to claim 6, wherein:

the pedestrian light sources include a plurality of first pedestrian light sources that emits light in the first direction and a plurality of second pedestrian light sources that emits light in the second direction;

the vehicle light sources include a plurality of first vehicle light sources that emits light in the third direction and a plurality of second vehicle light sources that emits light in the fourth direction; and the control device is configured to separately control the first pedestrian light sources and the second pedestrian light sources, and separately control the first vehicle light sources and the second vehicle light sources.

10. The system according to claim 6, wherein:

each of the pedestrian light sources emits light in both the first direction and the second direction; and each of the vehicle light sources emits light in both the third direction and the fourth direction.

11. A control method of a marking device that includes a plurality of pedestrian light sources on a roadway and that emits light in at least one of a first direction and a second direction along a width direction of the roadway, a plurality of vehicle light sources on the roadway and that emits light in at least one of a third direction and a fourth direction along an extension direction of the roadway, a first sensor configured to detect that a pedestrian is going to cross the roadway, a second sensor configured to detect that the vehicle on the roadway, and a control unit configured to separately control the pedestrian light sources and the vehicle light sources, the control method comprising:

lighting the pedestrian light sources with the control unit to mark a first pedestrian crossing to be visually recognized by the pedestrian;

lighting the vehicle light sources with the control unit to mark a second pedestrian crossing to be visually recognized by a driver of a vehicle on the roadway;

causing at least the first pedestrian crossing to be marked when the pedestrian who is going to cross the roadway is detected; and causing both the first pedestrian crossing and the second pedestrian crossing to be marked when the pedestrian who is going to cross the roadway is detected and the vehicle is detected on the roadway.

12. The control method according to claim 11, wherein the second pedestrian crossing is not marked and the first pedestrian crossing is marked when the pedestrian who is going to cross the roadway is detected and the vehicle is not detected on the roadway.

13. The control method according to claim 11, wherein:

the pedestrian light sources are distributed in a plurality of first regions on the roadway;

the vehicle light sources are distributed in a plurality of second regions on the roadway; and the first regions and the second regions are alternately arranged side by side from one end side to another end side in the width direction of the roadway.

14. The control method according to claim 11, wherein:

the pedestrian light sources include a plurality of first pedestrian light sources that emits light in the first direction and a plurality of second pedestrian light sources that emits light in the second direction;

the vehicle light sources include a plurality of first vehicle light sources that emits light in the third direction and a plurality of second vehicle light sources that emits light in the fourth direction; and the control unit is configured to separately control the first pedestrian light sources and the second pedestrian light sources, and separately control the first vehicle light sources and the second vehicle light sources.

* * * * *